Figure 1:
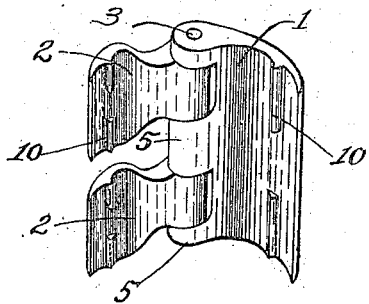
Figure 2:
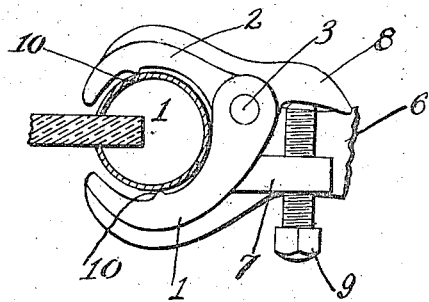
Figure 3:
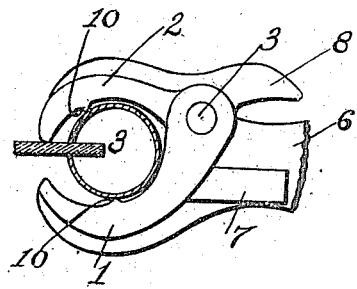
Figure 4:
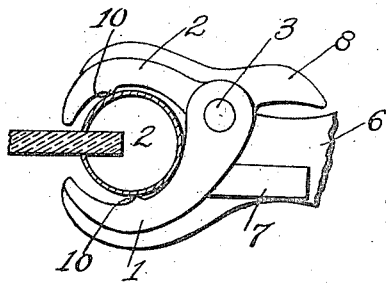
Figure 5:
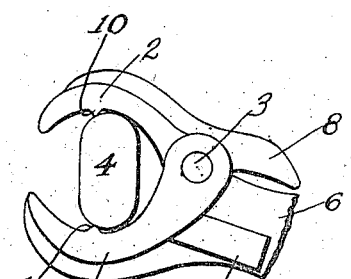
Figure 6:
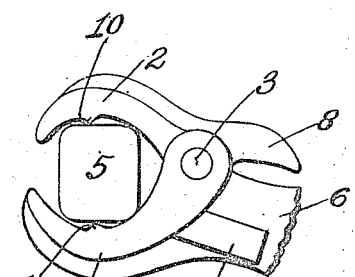

E. A. HAWTHORNE.
CLAMP.
APPLICATION FILED DEC. 1, 1916.

1,239,595.

Patented Sept. 11, 1917.

Inventor
Ellsworth A. Hawthorne
By (signature)
Attorney

UNITED STATES PATENT OFFICE.

ELLSWORTH A. HAWTHORNE, OF BRIDGEPORT, CONNECTICUT.

CLAMP.

1,239,595.  Specification of Letters Patent.  Patented Sept. 11, 1917.

Application filed December 1, 1916. Serial No. 134,250.

*To all whom it may concern:*

Be it known that I, ELLSWORTH A. HAWTHORNE, a citizen of the United States, residing at Bridgeport, county of Fairfield, State of Connecticut, have invented certain new and useful Improvements in Clamps, of which the following is a specification.

This invention relates to clamps and particularly to a clamp for mounting a lamp of the spotlight type on the windshield of an automobile or other vehicle. These lamps are required to be so mounted upon the windshield of any car as to permit of their being swung to direct the light in any direction. It is possible to provide for a universal adjustment of the lamp itself, but it has been difficult to devise a clamp which would be capable of adjustment to the various types of windshields used upon different makes of cars. Windshield frames are made of tubings of various sections and diameters according to the preference of the individual manufacturer, or designer, and these sections range from the truly cylindrical tubing to the oval and sometimes square tubings.

The object of my invention is to provide a clamp for a spotlight which will be capable of use with any design of windshield tubing and which will therefore have a universal field of use. This object is secured by the clamp of the present invention.

My clamp in its preferred embodiment consists of a relatively fixed clamping jaw or leaf and a pair of independently adjustable pivoted clamp jaws or leaves. Each clamp member has its contacting face curved or concaved and preferably unequally divided between its ends by a low bearing rib set below the plane of ends of the curved member. When the clamp is applied to a windshield the jaws adjust themselves so as to find maximum bearing on the tubing and are each independently set up to retain the clamp in adjusted position. The clamp jaws moreover are so arranged relatively as to themselves receive the tightening pressure in setting the clamp upon the windshield tubing. This obviates the formation of dents in the tubing as commonly occurs in those clamps where the set screws or other tightening devices work directly against the windshield tubing.

The construction and operation of my clamp is fully disclosed in the specification which follows. In the drawing accompanying that specification I have shown my clamp in its application to windshield tubings of widely different design and diameters in order to fully illustrate its universal character. Throughout the specification and drawings like reference characters are correspondingly applied and in the drawings:

Figure 1 is a perspective view of my clamp open.

Figs. 2 to 6 inclusive, are plan views illustrating the application of the clamp to windshield tubings of various design and cross section.

My clamp consists of a relatively long fixed clamp jaw or leaf 1, and a pair of short independently adjustable clamp leaves 2—2, pivoted on a common pintle 3 which is journaled in bearings 5 formed on the end of a clamp carrying arm 6. The other end of this arm is suitably connected by swivel or otherwise to a lamp carrying arm, not shown, on which it is pivotally mounted. The bracket thus provided allows the lamp universal adjustment.

The clamp jaw 1 has a pair of spaced lateral extensions or lugs 7 opposed to similar extensions or lugs 8 formed each on a clamp jaw 2. The extensions or lugs 7 receive each a set screw 9 and these set screws bear against the adjacent faces of the extensions or lugs 8 of the leaves 2 whereby to independently adjust the jaws 2—2 upon the windshield tubing without directly engaging said tubing and thereby forming dents therein.

Each jaw 1 and 2—2 is curved or concaved and provided intermediate of the concaved part with internal vertical low bearings which as here shown are in the forms of ribs 10 which when the clamp is applied to a windshield cause it to find engagement on plural lines of contact across the whole jaw or at one or the other side thereof. The lines of engagement between the jaw faces and the sides of the windshield tubing depend upon the diameter and cross section of the tubing itself, but each jaw engages the tubing on two or more lines of contact on either one side or both sides of each jaw, and through its engagement serves to positively hold the adjustment of the clamp. I have illustrated in Figs. 2 to 6 inclusive, my clamp applied to windshield tubing of various designs and diameters in order to make clear the universal nature of the clamp. It will therefore be seen that my clamp may be applied to windshield tubing of practically any design and diameter short of a diameter greater than the distance between the clamp leaves when opened to their maximum extent. I am thus enabled to provide a lamp mount applicable to substantially any windshield tubing to be found on any car.

Various modifications in the form and construction of my device may obviously be resorted to if within the limits of the appended claims.

What I therefore claim and desire to secure by Letters Patent is:

1. A clamp adapted for use upon supports of varying cross sections, comprising a fixed jaw and a pair of movable jaws, said jaws concaved and each having a bearing rib on its internal face, and each having a portion extending beyond said concavity, and adjustments acting directly against said extensions of the movable jaws for independently closing said jaws.

2. A clamp adapted for use upon supports of varying cross sections, comprising a relatively fixed concaved jaw, a pair of independently adjustable jaws concaved, and operatively connected with said fixed jaw, a bearing rib on the internal face of each jaw intermediate the ends of the concavity and unequally dividing said concavity and arranged to bear upon opposed portions of a support disposed between said jaws along parallel lines of contact, and means for independently adjusting said pair of movable jaws.

3. A clamp adapted for use upon supports of varying cross sections, comprising a relatively fixed jaw, a pair of independently adjustable jaws operatively connected with said fixed jaw and having rearward extensions, a bearing rib on the internal face of each jaw, and means acting directly against said rearward extensions of the pair of movable jaws for independently adjusting said jaws.

4. A clamp adapated for use upon supports of varying cross sections, comprising an elongated relatively fixed jaw having bearings for a pintle, a pintle in said bearings, a pair of relatively short independently adjustable jaws pivoted on said pintle operatively connected with said fixed jaws, a bearing rib on the internal face of each jaw, spaced rearward extensions on the fixed jaw, a rearward extension on each of said movable jaws, and set screws in said extensions of the fixed jaw for acting upon the extensions of the movable jaws to independently adjust said movable jaws.

5. A clamp adapted for use upon supports of varying cross-sections, comprising a fixed jaw having a rearwardly extending arm, a pair of independently adjustable jaws operatively connected with said fixed jaw, a bearing rib on the internal face of each jaw, and means for independently adjusting said pair of adjustable jaws.

6. A clamp adapted for use upon supports of varying cross sections, comprising a fixed jaw and a pair of relatively movable concaved jaws operatively connected with said fixed jaw, each of said movable jaws having two bearing surfaces on its internal face, and each having an intermediate bearing point arranged below the plane of said bearing surfaces, and adjustments for closing said movable jaws.

7. A clamp adapted for use upon supports of varying cross sections, comprising a fixed jaw and a pair of relatively movable concaved jaws operatively connected with said fixed jaw, each of said movable jaws having two bearing surfaces on its internal face and each having an intermediate bearing point arranged below the plane of said bearing surfaces, and said bearing points unequally dividing the concavity defined by said jaws, and adjustments for independently closing said movable jaws.

In testimony whereof I affix my signature in presence of two witnesses.

ELLSWORTH A. HAWTHORNE.

Witnesses:
E. HORACE HAWTHORNE,
E. STEWART HAWTHORNE.